(12) United States Patent
Drumm

(10) Patent No.: US 9,199,618 B2
(45) Date of Patent: Dec. 1, 2015

(54) ELECTROHYDRAULIC BRAKE SYSTEM AND METHOD FOR OPERATING THE SAME

(75) Inventor: Stefan A. Drumm, Saulheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 438 days.

(21) Appl. No.: 13/144,569

(22) PCT Filed: Dec. 16, 2009

(86) PCT No.: PCT/EP2009/067331
§ 371 (c)(1),
(2), (4) Date: Aug. 23, 2011

(87) PCT Pub. No.: WO2010/083925
PCT Pub. Date: Jul. 29, 2010

(65) Prior Publication Data
US 2011/0291470 A1    Dec. 1, 2011

(30) Foreign Application Priority Data
Jan. 23, 2009 (DE) .................. 10 2009 005 937

(51) Int. Cl.
*B60T 13/66* (2006.01)
*B60T 8/40* (2006.01)
*B60T 1/10* (2006.01)
(Continued)

(52) U.S. Cl.
CPC ............ *B60T 8/4077* (2013.01); *B60T 1/10* (2013.01); *B60T 7/042* (2013.01); *B60T 13/745* (2013.01); *B60T 2270/604* (2013.01)

(58) Field of Classification Search
CPC ......... B60T 7/042; B60T 8/4801; B60T 8/00; B60T 8/409; B60T 13/686; B60L 7/26
USPC ............... 303/3, 113.4, 151, 152, 155, 114.1
See application file for complete search history.

(56) References Cited

U.S. PATENT DOCUMENTS

| | | | | |
|---|---|---|---|---|
| 4,398,389 A | * | 8/1983 | Horvath | .......................... 60/545 |
| 5,609,399 A | * | 3/1997 | Feigel et al. | ............... 303/113.4 |
| 5,967,621 A | * | 10/1999 | Ito et al. | ........................... 303/15 |

(Continued)

FOREIGN PATENT DOCUMENTS

| DE | 10 2006060 434 | | 6/2008 | |
|---|---|---|---|---|
| DE | 102007024785 A1 | * | 10/2008 | ............... B60T 8/36 |

(Continued)

OTHER PUBLICATIONS

International Search Report—PCT/EP2009/067331—Mar. 22, 2010.

*Primary Examiner* — Bradley King
*Assistant Examiner* — Stephen Bowes
(74) *Attorney, Agent, or Firm* — Brinks Gilson & Lione

(57) ABSTRACT

Disclosed is an electrohydraulic brake system for use in vehicles which can be braked by means of generator operation of an electric drive motor. The brake system comprises, inter alia, a brake booster and an electronic control unit which is provided for distributing the braking effect between a generative component or recuperation braking component and a friction braking component. In order to optimize the take-up of pressure medium, in particular during recuperation braking, the brake booster (6, 11, 15) is configured to be electrically actuated by the electronic control unit (10). The boosting force generated by the brake booster (6, 11, 15) is exerted as a function of variables relevant to the brake system.

10 Claims, 3 Drawing Sheets

(51) Int. Cl.
  *B60T 7/04*    (2006.01)
  *B60T 13/74*   (2006.01)

(56) References Cited

U.S. PATENT DOCUMENTS

| | | | |
|---|---|---|---|
| 6,021,365 A * | 2/2000 | Ishii et al. | 701/22 |
| 6,302,497 B1 | 10/2001 | Takayama | |
| 6,354,672 B1 | 3/2002 | Nakamura et al. | |
| 6,412,882 B1 * | 7/2002 | Isono et al. | 303/114.1 |
| 6,494,547 B2 * | 12/2002 | Higashimura et al. | 303/152 |
| 6,655,754 B2 * | 12/2003 | Crombez et al. | 303/152 |
| 7,284,803 B2 * | 10/2007 | Matsuura et al. | 303/152 |
| 2002/0140283 A1 | 10/2002 | Kusano et al. | |
| 2004/0061375 A1 | 4/2004 | Drott et al. | |
| 2007/0013230 A1 * | 1/2007 | Yang | 303/152 |
| 2007/0262638 A1 * | 11/2007 | Kodama et al. | 303/9.62 |
| 2007/0284936 A1 * | 12/2007 | Maki et al. | 303/15 |
| 2008/0246333 A1 | 10/2008 | Joyce | |
| 2009/0229931 A1 * | 9/2009 | Baumann et al. | 188/72.2 |
| 2010/0263367 A1 * | 10/2010 | Drumm | 60/545 |

FOREIGN PATENT DOCUMENTS

| | | | |
|---|---|---|---|
| EP | WO 97/14590 | 4/1997 | |
| EP | 1 090 823 A2 | 4/2001 | |
| EP | 1 106 461 A2 | 6/2001 | |
| EP | WO 02/064409 | 8/2002 | |
| JP | 59-118559 | 7/1984 | |
| JP | 11-48950 | 2/1999 | |
| JP | 11037043 A * | 2/1999 | F04B 7/04 |
| JP | 2002255018 A * | 9/2002 | B60T 8/48 |
| WO | 97/18116 A1 | 5/1997 | |

* cited by examiner

ELECTROHYDRAULIC BRAKE SYSTEM AND METHOD FOR OPERATING THE SAME

CROSS REFERENCE TO RELATED APPLICATIONS

This application claims priority to German Patent Application No. 102009005937.7, filed Jan. 23, 2009, and International Patent Application No. PCT/EP2009/067331, filed Dec. 16, 2009.

TECHNICAL FIELD OF THE INVENTION

The invention relates to an electrohydraulic brake system for use in vehicles which can be braked by means of generator operation of an electric drive motor, with an actuation unit which is controlled by means of a brake pedal and is configured as a combination of a hydraulic brake master cylinder and a brake booster connected upstream thereof which additively superimposes a boosting force on an actuating force induced via the brake pedal; with hydraulic brake lines which are connected to the actuation unit and to which brakes of the vehicle are connected; with an electronic control unit which is provided for distributing the braking effect between a generative or recuperation braking component and a friction braking component, and with a cylinder-piston arrangement, connected to the actuation unit, for taking up a pressure medium volume corresponding to the generative or recuperation braking component. In addition, the invention relates to a method for operating such a brake system.

BACKGROUND OF THE INVENTION

In passenger cars according to the general state of the art, hydraulic fluid (=pressure medium) is pressurized in the pressure chambers of the brake master cylinder by a brake master cylinder force as a result of a brake pedal actuation by the driver, which force is composed, in a ratio of 1 to V−1, from an actuating force component exerted by the driver and a boosting force component exerted by the brake booster. In passenger car brake systems the force boosting factor V is usually between 3 and 7, in most passenger cars approximately 4. That is to say that upon actuation of the brake pedal for activating the friction brakes of an average passenger car, 4/5 of the master cylinder pressure is generated by the brake booster and only 1/5 by the driver via the brake pedal. This has the agreeable effect that passenger car brake systems can be operated with moderate pedal forces.

An electrohydraulic brake system of the type mentioned in the introduction is described in DE 10 2006 060 434 A1. In the known brake system it is proposed, in order to simulate in recuperation braking the brake pedal characteristic known from normal braking, not to conduct the hydraulic fluid pressurized in the brake master cylinder to the wheel brakes but to take up same in a cylinder-piston arrangement. In this case it is felt to be disadvantageous that 4/5 (where V=4, otherwise a proportion V/(1+V)) of the pressure values exerted, and the associated take-up of pressure medium, are unnecessary. During recuperation braking no brake boosting is required.

SUMMARY OF THE INVENTION

It is therefore the object of the present invention to eliminate the above-mentioned disadvantage of the known brake system.

This object is achieved according to the invention in that the brake booster is configured to be electrically activated by an electronic control unit.

With regard to the method, the object is achieved in that the boosting force generated by the brake booster is exerted as a function of variables relevant to the brake system. The variables relevant to the brake system are preferably, on the one hand, the deceleration requests from the driver and automatic driver assist systems and, on the other, the deceleration potentials of recuperation braking, of an unboosted, of a boosted and of an electronically controlled actuation of the friction brakes, and mixed forms thereof. The aforementioned improvement in operating the brake system according to the invention can be achieved by these features.

If the sum of the deceleration potentials of recuperation braking and of unboosted braking are enough to meet the deceleration request, it is sufficient, in order to establish the familiar pedal characteristic, that the cylinder-piston arrangement takes up hydraulic fluid at the "unboosted" pressure of the brake master cylinder resulting only from the actuating force component. Unnecessary consumption of actuating energy of the brake booster in order to provide the boost component is thereby avoided during recuperation braking.

The boosting force is preferably generated by the action of an electronically controlled pressure made available by a pressure source.

According to a development of the brake system according to the invention, the pressure source comprises a hydraulic high-pressure accumulator chargeable by means of a pump. The pressure source for making available the electronically controlled pressure advantageously also includes a pressure control valve.

The piston of the cylinder-piston arrangement is preferably in the form of a stepped piston.

According to a preferred embodiment, the larger surface area of the stepped piston is connected to the pressure source via an interposed electromagnetically actuated 2/2-way valve. The electromagnetically actuated 2/2-way valve is preferably an analog-controllable, normally open (SO) valve.

It is also preferred that the larger surface area of the stepped piston is connected to an unpressurized pressure medium reservoir via an interposed electromagnetically controllable 2/2-way valve. The electromagnetically actuated 2/2-way valve is especially preferably in the form of an analog-controllable, normally closed (SG) valve.

According to a development of the brake system according to the invention, sensor means are provided for detecting the actuating travel of the brake pedal, a variable representing the boosting force, and the pressure induced in the brake master cylinder.

According to a development of the method according to the invention, the boosting force during proportional friction and recuperation braking is calculated such that it is just sufficient to bring about the required deceleration of the vehicle.

It is also preferred that a boosting force is not superimposed on the actuating force applied at the brake pedal during purely recuperation braking.

Advantageously, a braking request is determined from the brake pedal actuating travel, the brake pedal actuating force and further driver-dependent and driver-independent variables.

It is also preferred that a signal for the instantaneously possible recuperation braking effect is determined from brake system data such as the admissible output of the electric motor operating as a generator, the admissible charging capacity of an electric energy storage device or battery present in the vehicle and the current charge state of the electric energy storage device or accumulator present in the vehicle.

According to a development of the method according to the invention, upon the occurrence of a braking request the quantity (magnitude) of this braking request is compared to the deceleration potentials of the instantaneously possible recuperation braking and of an unboosted transmission of the brake pedal actuating force, and various deceleration-effective actions are implemented in dependence on this comparison.

As deceleration-effective actions, recuperation braking, the transmission or modulated transmission of the pressure induced in the brake master cylinder to the wheel brakes, and the exertion of a boosting force are preferably used.

The deceleration-effective actions are advantageously coordinated by an electronic control and regulation circuit and adjusted to one another in such a manner that their totality yields a vehicle deceleration which occurs in purely friction braking with the predetermined boosting force.

The present invention is explained in more detail below with reference to two exemplary embodiments and to the appended schematic drawings, identical components being denoted by the same reference symbols.

DETAILED DESCRIPTION OF THE DRAWINGS

Figure 1:
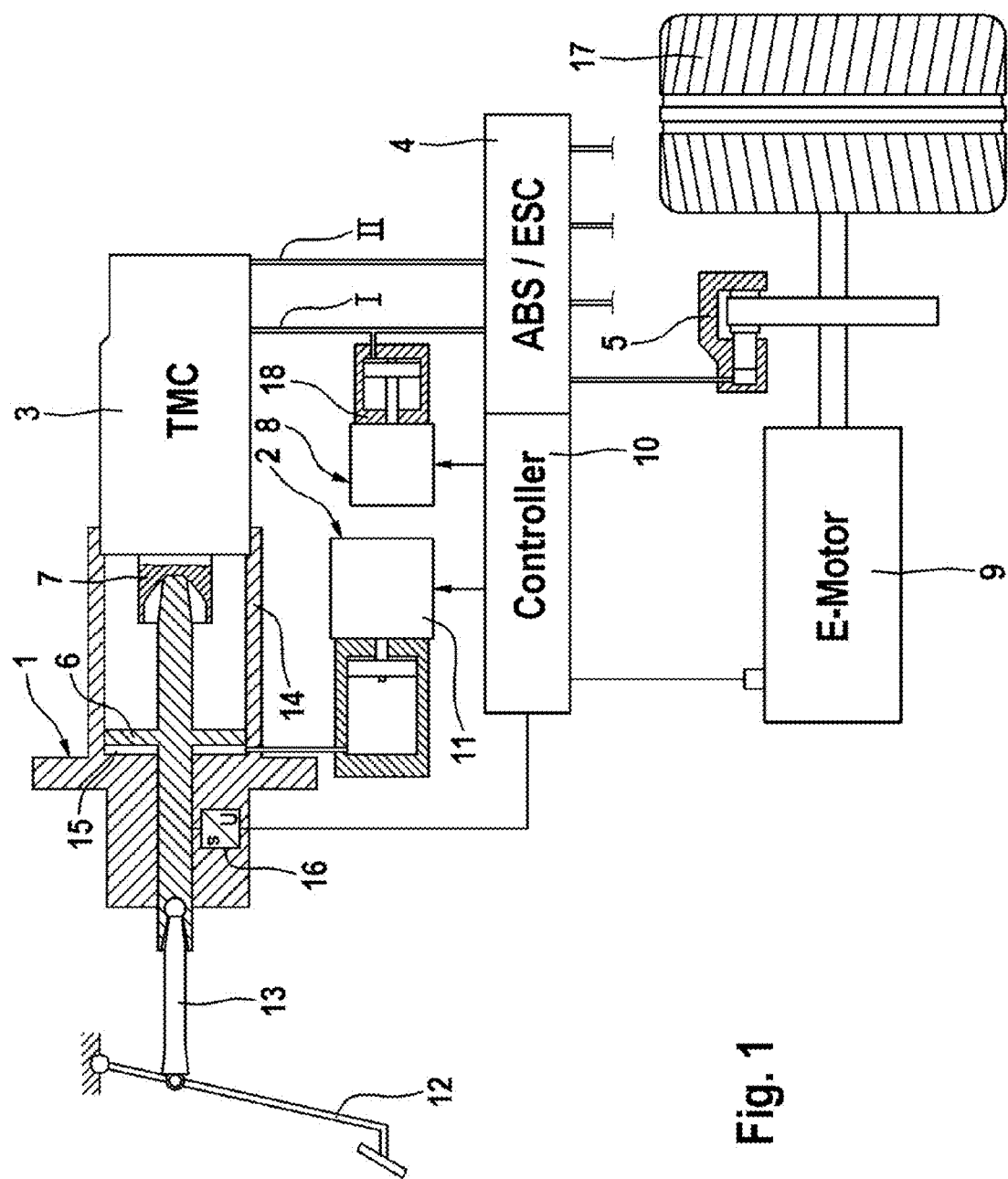
FIG. 1 shows the structure of a first configuration of the brake system according to the invention.

The electrohydraulic brake system according to the invention shown in FIG. 1 consists essentially of an actuation unit 1, a hydraulic pressure source 2, the actuation unit 1 and the pressure source 2 forming a brake booster, and of a brake master cylinder or tandem master cylinder 3 effectively connected downstream of the brake force booster, to the pressure chambers (not shown) to which tandem master cylinder 3 are connected wheel brakes circuits I, II which supply wheel brakes of a motor vehicle with hydraulic pressure medium via an interposed known ABS/ESP hydraulic unit or a controllable wheel brake pressure modulation module 4, only one of which wheel brakes is shown for simplicity, and is denoted by reference numeral 5. In the example shown, the aforementioned pressure source 2 is in the form of an electrohydraulic actuator 11. Connected to one (I) of the wheel brake circuits and I, II is a hydraulic cylinder-piston arrangement 8, which is also in the form of an electrohydraulic actuator 18 and which makes possible a lengthening of the brake pedal travel during recuperation braking. An electric motor 9 serves to drive the vehicle (not shown), which electric motor 9 can be operated both in a drive mode and in a recuperation mode in which a proportion of the kinetic energy which must be dissipated in order to brake the vehicle is absorbed by the electric motor 9 now working as a generator.

The brake system according to the invention further includes an electronic brake system control unit 10. In order to activate the brake actuation unit 1, there is provided a brake pedal 12 with which is coupled a piston rod 13 which is in force-transmitting connection, in series with a booster piston 6, to a first piston or primary piston 7 of the brake master cylinder 3. The booster piston 6 is guided in an axially displaceable manner in a booster housing 14 in which it delimits a hydraulic booster chamber which is denoted by reference numeral 15. Signals of a travel sensor 16 and data containing information on the state of the electric motor 9 are supplied to the electronic brake system control unit 10. In this case the travel sensor 16 serves to detect a driver deceleration request and senses the actuation travel of the piston rod 13. From the aforementioned signals and data, activation signals for both electrohydraulic actuators 11, 18 and for hydraulic pressure control valves (not shown) contained in the wheel brake pressure modulation module 4 are processed in the electronic brake system control unit 10. A vehicle wheel which is driven and can be braked by an electric motor 9 is denoted by reference numeral 17.

Figure 2:
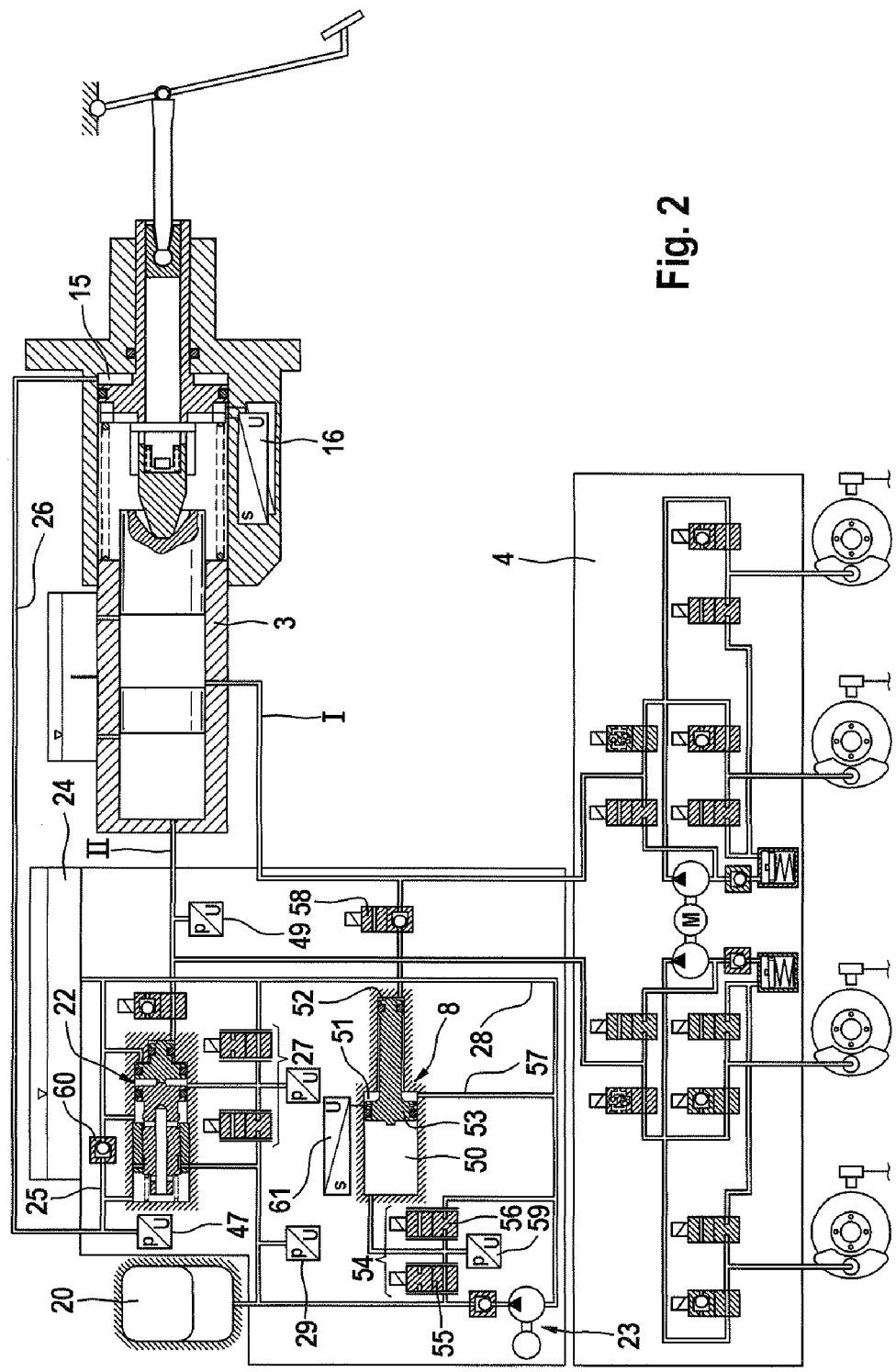
FIG. 2 shows the structure of a second configuration of the brake system according to the invention.

In the configuration shown in FIG. 2, the aforementioned pressure source 2 is formed by a hydraulic high-pressure accumulator 20 with a pressure control valve 22 connected downstream thereof. A motor-pump unit 23 serves to charge the high-pressure accumulator 20. The outlet of the pressure control valve 22 is connected, on the one hand, by means of a hydraulic connection 25 to a pressure medium reservoir 24 and, on the other, via a line 26 adjoining the hydraulic connection 25 to the booster chamber 15, which is connected upstream of the brake master cylinder 3 and was mentioned with reference to FIG. 1. Associated with the pressure control valve 22 is a pilot stage 27, the function of which is explained in the text which follows. A further line 28 connects the suction side of the motor-pump unit 23 to the aforementioned pressure medium reservoir 24. The motor-pump unit 23 is preferably in the form of an independent assembly and is equipped with fastenings and hydraulic connections which insulate structure-borne noise. The hydraulic pressure available in the high-pressure accumulator 20 is detected by a pressure sensor denoted by reference numeral 29.

It is further apparent from FIG. 2 that the cylinder-piston arrangement 8 mentioned in connection with FIG. 1 is formed by a first hydraulic chamber 50, a second hydraulic chamber 51, a third hydraulic chamber 52 and a stepped piston 53. In this case the larger surface area of the stepped piston 53 separates the first chamber 50 from the second chamber 51, while the third chamber 52 is delimited by the smaller surface area of the stepped piston 53. The distance traveled by the stepped piston 53 is monitored by a travel sensor which is denoted by reference numeral 61. The first hydraulic chamber 50 is connected to a valve arrangement 54 which is formed by two serially-connected, analog-controllable 2/2-way valves 55, 56. The first-mentioned 2/2-way valve 55 is in the form of a normally open (SO) valve and is preferably connected between the first chamber 50 and the aforementioned high-pressure accumulator 20. The second-mentioned 2/2-way valve 56 is in the form of a normally closed (SG) valve and is preferably connected between the first chamber 50 and the line 28 leading to the pressure medium reservoir 24. The second hydraulic chamber 51 is connected via a line section 57 to the line 28 and therefore to the pressure medium reservoir 24, while the third chamber 52 is connected via an interposed 2/2-way valve 58 to the first brake circuit I. In the operating (rest) state illustrated, the 2/2-way valve 58 performs the function of a non-return valve closing towards the cylinder-piston arrangement 8, whereas in the switched-over state of the valve 58 the third chamber 52 is connected to the brake circuit I. The pressure induced in the first hydraulic chamber 50 is detected at the central tapping point of the valve arrangement 54 by means of a pressure sensor which is denoted by reference numeral 59.

As is apparent, in particular, from FIG. 3, the pressure control valve 22 has a two-stage configuration and preferably comprises, in addition to the aforementioned electrically actuated pilot stage 27, a valve main stage with double hydraulic actuation denoted by reference numeral 30, as well as a hydraulic actuation stage the structure of which will be explained in the following description.

The pilot stage 27 consists of a serial connection of an analog-controllable, normally closed (SG) 2/2-way valve 31 and an analog-controllable, normally open (SO) 2/2-way valve 32, the hydraulic central tapping point 33 between the two valves 31, 32 supplying one of the actuation pressures for the valve main stage 30. The hydraulic actuation stage is formed by a first actuation chamber 34, a first actuation piston or stepped piston 35, an annular chamber 48 connected to the pressure medium reservoir 24 and a second actuation chamber 36, which is delimited by the stepped piston 35 and is connected to the above-mentioned central tapping point 33 of the pilot stage 27. The second actuation chamber 36 is delimited on the other side by a second actuation piston 37 which, together with a valve sleeve 38, delimits a reservoir connection chamber 39 and which, in the configuration shown, is formed in one piece with a valve body 40. The valve sleeve 38, together with the valve body 40, forms the aforementioned main stage 30 of the pressure control valve 22.

Figure 3:
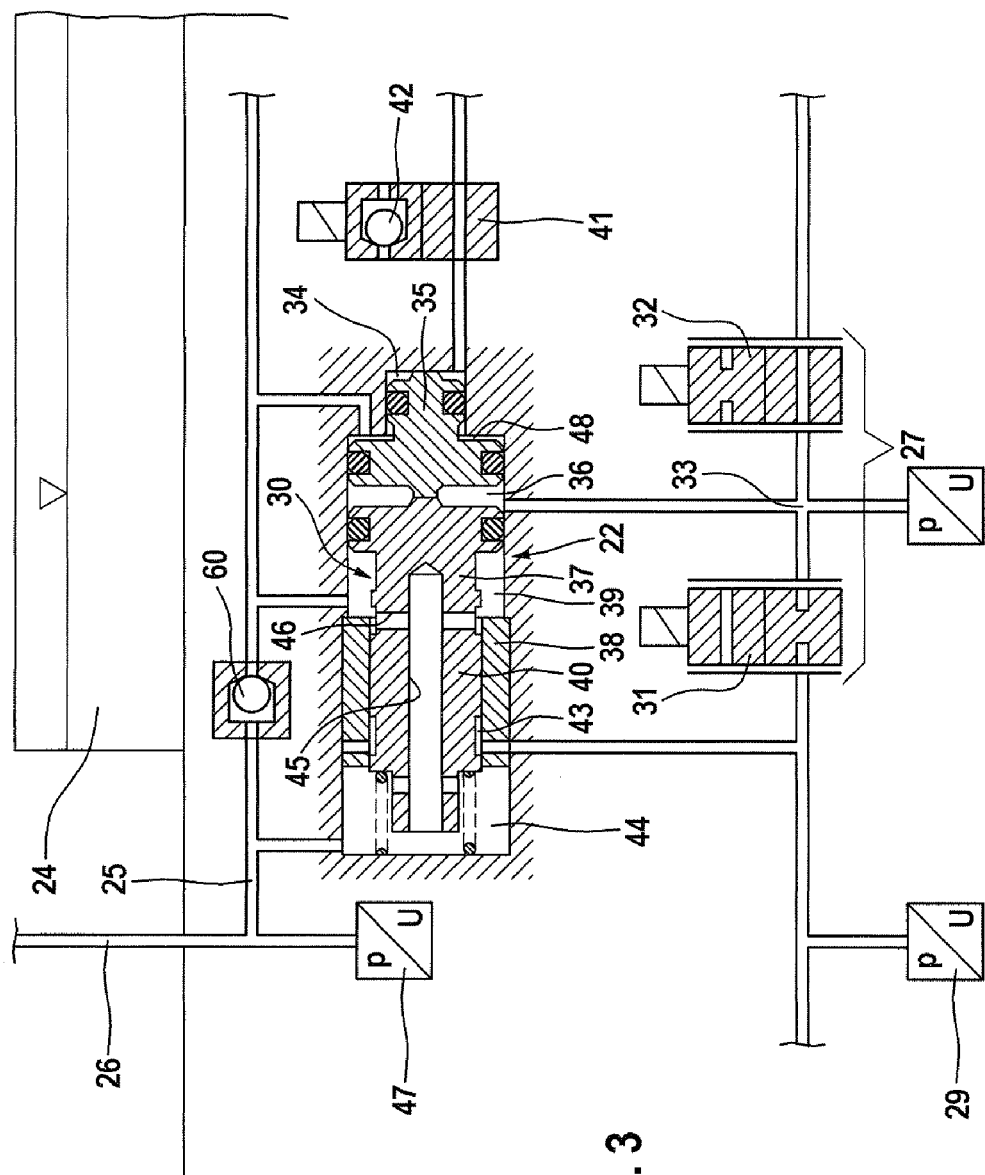
FIG. 3 shows an essential part of the brake booster used in the brake system according to FIG. 2 on an enlarged scale.

It is further apparent from FIG. 3 that the first actuation chamber 34 is connected via an interposed electromagnetically actuated, normally open (SO) 2/2-way valve 41 to the second brake circuit II. In its energized switching position, the 2/2-way valve 41 performs the function of a non-return valve closing towards the actuation stage, as is indicated by the corresponding hydraulic symbol denoted by reference numeral 42. The pressure induced in the second brake circuit is detected by a pressure sensor 49 (see FIG. 2).

As this takes place the valve body 40 together with the valve sleeve 38 forms a high-pressure connection chamber 43 which is connected to the high-pressure accumulator 20. The high-pressure connection chamber 43 is connected, by a displacement of the valve body 40, to a working pressure chamber 44 which forms the outlet of the pressure control valve 22 and which, in the outlet position or rest position of the valve body 40 shown, is connected by means of pressure medium passages 45, 46 to the reservoir connection chamber 39. The boost pressure induced in the working pressure chamber 44 is detected by a third pressure sensor 47. In this case it is advantageous if the diameter of the valve body 40 guided in the valve sleeve 38 is larger than the diameter of the smaller step of the stepped piston 35. It is also apparent from FIG. 3 that the line 26 leading to the booster chamber 15, and the further line 25 connected thereto and leading to the pressure medium reservoir 24, are connected to the working pressure chamber 44 (via the aforementioned connecting line 25). In this case, a non-return valve 60 closing towards the pressure medium reservoir 24 is incorporated in the last-mentioned line 25.

The operation of the brake system according to the invention is explained in more detail in the following text in conjunction with the drawing.

It should be mentioned first that a driver deceleration wish or braking request is determined from the brake pedal travel signal (sensor 16), from the actuating force signal, from further driver-dependent signals generated, for example, by alternative operating elements, and from driver-independent signals generated, for example, by driver assist systems such as distance control, collision avoidance, etc. In this case it is expedient if the signal corresponding to the actuating force is determined by subtraction of the boosting force generated in the boost chamber 15, which is determined from the output signal of the pressure sensor 47, from the total actuating force acting on the master cylinder piston 7 (which can determined from the signal of the pressure sensor 49). An instantaneously possible recuperation braking effect is determined from other brake system data such as the admissible output of the electric motor 9 working as a generator, the admissible charging capacity of an energy storage device or battery present in the vehicle, and the current charge state of the battery.

When the above-mentioned braking request is present, its quantity (magnitude) is compared to the deceleration potentials of the instantaneously possible recuperation braking and of an unboosted transmission of the brake pedal actuating force, and various deceleration-effective actions are carried out in dependence on this comparison. As deceleration-effective actions, recuperation braking, the transmission or modulated transmission of the pressure induced in the brake master cylinder 3 to the wheel brakes, and the exertion of a boosting force are used.

The deceleration-effective actions are coordinated by the electronic control and regulation circuit 10 and are adjusted to one another in such a manner that their totality yields a vehicle deceleration which occurs in purely friction braking with the predetermined boosting force.

In this case, essentially two different operating modes are possible:

The first operating mode corresponds to a purely electric, so-called recuperation operating mode, in which the vehicle is braked by the effect of the electric motor 9 working as a generator (FIG. 1). During recuperation braking, no boosting force component is superimposed on the actuating force component exerted on the brake pedal 12. In this case the volume taken up by the cylinder-piston arrangement 8 is controlled in such a manner that the brake pedal characteristic which is produced in purely hydraulic braking, with the boosting force predetermined by the brake force booster 11, 15 or 20, 22, 15, can be felt at the brake pedal 12. The volume of pressure medium displaced from the brake master cylinder 3 during such braking is taken up by the cylinder-piston arrangement 8, so that the friction brakes are not subjected to hydraulic pressure.

In a second operating mode, which is characterized by actuation of the master cylinder both by the actuating force and by the boosting force superimposed on the actuating force, braking of the vehicle is carried out with a friction braking component and with a recuperation braking component. The boosting force is preferably calculated in such a manner that it is just sufficient to achieve the required vehicle deceleration effect. The pedal characteristic which can be felt at the brake pedal 12 again corresponds to that mentioned in connection with the first operating mode. In this case the recuperation braking component is given highest priority, while the boosting force is given lowest priority, so that this boosting force required to achieve the overall braking effect demanded is kept small.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An electrohydraulic brake system comprising:
   an electric motor operating as a generator;
   an actuation unit controlled by a brake pedal and configured as a combination of a hydraulic brake master cylinder and a first electrohydraulic actuator having an electrically actuated piston that linearly translates within a cylinder, the electrohydraulic actuator forming a brake booster connected upstream of the hydraulic brake master cylinder, the brake booster generating a pressure constituting a boosting force and additively superimposing the boosting force on an actuating force induced via the brake pedal;
   hydraulic brake lines connecting the actuation unit to friction brakes of the vehicle, the friction brakes being configured to produce a friction brake component;
   an electronic control unit for distributing a braking effect between a recuperation brake component produced by the generator and the friction brake component, the electronic control unit being configured to electrically actuate the brake booster; and
   a second electrohydraulic actuator being a linear actuator in the form of a cylinder-piston arrangement having a linearly translating piston, connected to the actuation unit, configured to take up a pressure medium volume from the hydraulic brake master cylinder, which corresponds to the recuperation brake component for producing a characteristic brake pedal feel resembling friction braking with a predetermined boosting force, wherein the second electrohydraulic actuator provides fluid uptake from the master cylinder.

2. The electrohydraulic brake system as claimed in claim 1, wherein the cylinder-piston arrangement is connected to one of the hydraulic brake lines between the hydraulic brake master cylinder and the friction brakes.

3. The electrohydraulic brake system as claimed in claim 1, wherein the first electrohydraulic actuator and the second electrohydraulic actuator are separate and act independently from each other based on signals from the electronic control unit.

4. A method of operating an electrohydraulic brake system for decelerating a vehicle, the method comprising the steps of:
   producing a brake system comprising:
      an electric motor operating as a generator;
      an actuation unit controlled by a brake pedal and configured as a combination of a hydraulic brake master cylinder and a first electrohydraulic actuator having an electrically actuated piston that linearly translates within a cylinder, the electrohydraulic actuator forming a brake booster connected upstream of the hydraulic brake master cylinder;
      hydraulic brake lines connecting the actuation unit to friction brakes of the vehicle, the friction brakes being configured to produce a friction brake component;
      an electronic control unit for distributing a braking effect between a recuperation brake component produced by the generator and the friction brake component, the electronic control unit being configured to electrically actuate the brake booster; and
      a second electrohydraulic actuator being a linear actuator in the form of a cylinder-piston arrangement having a linearly translating piston, connected to the actuation unit, configured to take up a pressure medium volume from the hydraulic brake master cylinder, which corresponds to the recuperation brake component for producing a characteristic brake pedal feel resembling friction braking with a predetermined boosting force, wherein the second electrohydraulic provides for fluid uptake from the master cylinder;
   calculating a boosting force as a function of signals or parameters related to the brake system;
   generating a pressure constituting the boosting force via the brake booster and additively superimposing the boosting force on an actuating force induced via the brake pedal; and
   causing the second hydraulic actuator in the form of a cylinder-piston arrangement having the linearly translating piston, during recuperation braking and during proportional friction and recuperation braking, to take up a pressure medium volume from the hydraulic brake master cylinder, which corresponds to the recuperation brake component, controlled to produce a characteristic brake pedal feel resembling friction braking with a predetermined boosting force.

5. The method as claimed in claim 4, wherein the signals or parameters related to the brake system comprise deceleration requests from the driver or from automatic driver assist systems and deceleration potentials of recuperation braking, of an unboosted, of a boosted and of an electronically controlled actuation of the friction brakes, and of mixed forms thereof.

6. The method as claimed in claim 4, further comprising the steps of:
   calculating the boosting force to be just sufficient to effect a required deceleration of the vehicle during proportional friction and recuperation braking;
   applying the boosting force.

7. The method as claimed in claim 4, further comprising the step of:
   determining an actuating force exerted on the brake pedal from a value of a pressure induced in the brake master cylinder and from a value representing the boosting force.

8. The method as claimed in claim 4, further comprising the step of:
   determining that a braking request has been made from a brake pedal actuation travel, a brake pedal actuating force and further driver-dependent and driver-independent signals or parameters.

9. The method as claimed in claim 4, further comprising the step of:
   generating a signal indicating an instantaneously possible recuperation braking effect based on brake system data comprising at least one of an admissible output of the electric motor working as a generator, an admissible charging capacity of an electric energy storage device or battery present in the vehicle, and a current charge state of the electric energy storage device or battery present in the vehicle.

10. The method as claimed in claim 4, wherein the first electrohydraulic actuator and the second electrohydraulic actuator are separate and act independently from each other based on signals from the electronic control unit.

* * * * *